US011497306B2

(12) United States Patent
Nichols (10) Patent No.: US 11,497,306 B2
(45) Date of Patent: Nov. 15, 2022

(54) POWER/DATA ACCESS MODULE

(71) Applicant: Ditto Sales, Inc./Versteel, Jasper, IN (US)

(72) Inventor: Jerald W. Nichols, Jasper, IN (US)

(73) Assignee: Ditto Sales, Inc., Jasper, IN (US)

( * ) Notice: Subject to any disclaimer, the term of this patent is extended or adjusted under 35 U.S.C. 154(b) by 376 days.

(21) Appl. No.: 16/834,005

(22) Filed: Mar. 30, 2020

(65) Prior Publication Data
US 2021/0298467 A1 Sep. 30, 2021

(51) Int. Cl.
*A47B 21/06* (2006.01)
*H02G 3/18* (2006.01)
*H01R 13/74* (2006.01)

(52) U.S. Cl.
CPC ............ *A47B 21/06* (2013.01); *H01R 13/74* (2013.01); *H02G 3/18* (2013.01); *A47B 2021/066* (2013.01); *A47B 2200/0082* (2013.01)

(58) Field of Classification Search
CPC .............. A47B 21/06; A47B 2021/066; A47B 2200/0082; A47B 2200/008; H02G 3/18; H01R 13/74
USPC ........................................ 108/50.02; 361/807
See application file for complete search history.

(56) References Cited

U.S. PATENT DOCUMENTS

| | | | | |
|---|---|---|---|---|
| 4,372,629 A * | 2/1983 | Propst | ..................... | A47B 21/06 439/942 |
| 9,504,318 B1 * | 11/2016 | O'Keefe | .................. | H02G 3/18 |
| 10,028,576 B1 * | 7/2018 | Yao | ........................... | A47B 9/20 |
| 2009/0165680 A1 * | 7/2009 | Bakker | ................... | A47B 21/06 108/50.02 |
| 2009/0293773 A1 * | 12/2009 | Miller | .................... | A47B 21/06 108/50.02 |
| 2010/0319953 A1 * | 12/2010 | Yochum | ................... | H02G 3/18 174/59 |
| 2013/0061783 A1 * | 3/2013 | Bennie | ..................... | H02G 3/38 108/25 |
| 2014/0295691 A1 * | 10/2014 | Byrne | .................... | H02G 3/105 439/538 |
| 2015/0194749 A1 * | 7/2015 | Kim | ...................... | H01R 13/506 439/655 |
| 2016/0022030 A1 * | 1/2016 | Scott | ...................... | H01R 13/60 439/31 |
| 2016/0037666 A1 * | 2/2016 | Page | ...................... | A47B 21/06 312/223.6 |

(Continued)

FOREIGN PATENT DOCUMENTS

| CA | 2890936 A1 * | 11/2015 | ............ A47B 21/06 |
|---|---|---|---|
| EP | 3751687 A1 * | 12/2020 | ............ H02G 3/086 |

*Primary Examiner* — Jose V Chen
(74) *Attorney, Agent, or Firm* — Maginot, Moore & Beck LLP (57) ABSTRACT

An assembly for providing access to an opening in a table includes an electrical module including a support panel carrying one or more electrical power sockets and/or data ports and a cable carrying electrical power and/or data wires connectable to the sockets/ports. The assembly further includes an access module that includes a grommet mountable to the table within the opening. The grommet including a flange defining a pair of opposing channels configured to slidably receive the support panel therein so that the one or more sockets/ports are accessible through the grommet when the access module is mounted to the table.

13 Claims, 10 Drawing Sheets

(56) References Cited

U.S. PATENT DOCUMENTS

| | | | |
|---|---|---|---|
| 2016/0079706 A1* | 3/2016 | Grudzewski | B60R 16/0222 |
| | | | 439/345 |
| 2016/0093972 A1* | 3/2016 | Akagi | H01R 13/743 |
| | | | 439/660 |
| 2016/0255951 A1* | 9/2016 | Nichols | H02G 3/185 |
| 2016/0315410 A1* | 10/2016 | Kim | H01R 13/6594 |
| 2017/0251806 A1* | 9/2017 | Newman | A47B 9/20 |
| 2017/0331237 A1* | 11/2017 | Smith | H01R 25/006 |
| 2019/0148874 A1* | 5/2019 | Sorrentino | H01R 13/5213 |
| | | | 439/136 |
| 2019/0166707 A1* | 5/2019 | Pedoeem | B65H 75/368 |
| 2019/0319411 A1* | 10/2019 | Rojas Galvan | H01R 13/72 |
| 2019/0361566 A1* | 11/2019 | Nagano | A47B 21/007 |
| 2022/0077622 A1* | 3/2022 | Johnston | H01R 25/006 |

* cited by examiner

POWER/DATA ACCESS MODULE

BACKGROUND

The present disclosure relates to power and data features for furniture, such as conference tables and work stations. In particular, the disclosure concerns a module to be inserted into an opening in a work surface that provides access to power and data receptacles supported beneath the work surface.

In this increasingly data-driven age people rely on their laptop, cell phone, and tablet at a conference or in their workplace. These electronic and computer devices require access to power and data lines. Whereas in the past a work surface was littered with power strips, electrical cords, and data cables, access modules have been provided that are mounted in the work surface so that these components can be hidden beneath the work surface, thereby ridding the work surface of a significant nuisance.

Figure 1A:
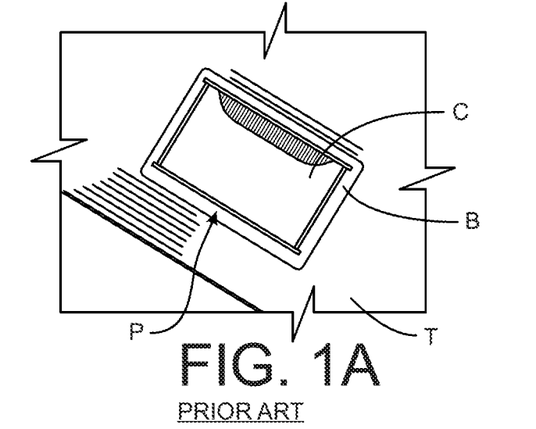
FIG. 1A is a perspective view of a prior art power/data access module positioned in an opening of a table, a cover of the module is shown in a closed position.
Figure 1B:
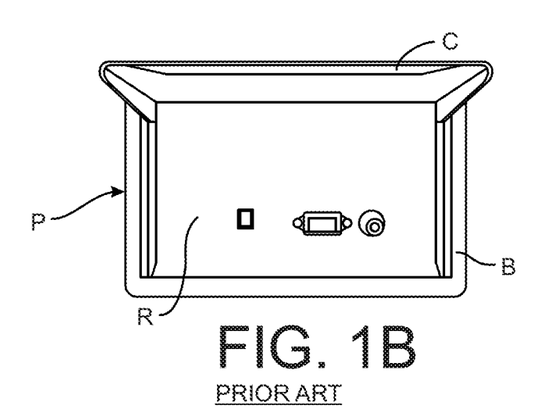
FIG. 1B is a perspective view of the prior art module of FIG. 1A, with the cover shown in an open position to expose power and data receptacles.
Figure 2:
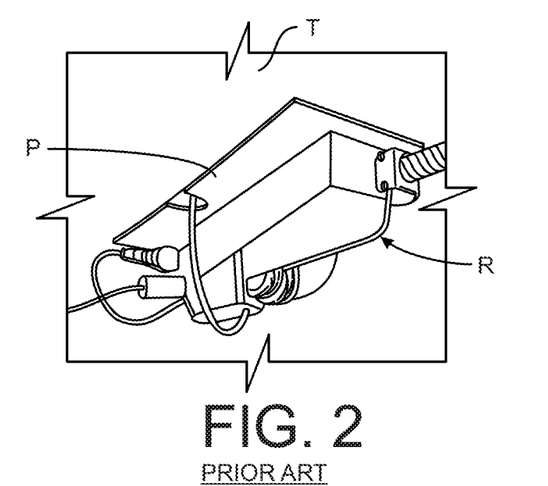
FIG. 2 is a perspective view of an underside of the prior art module and the table of FIG. 1A as well as a receptacle.
Figure 3A:
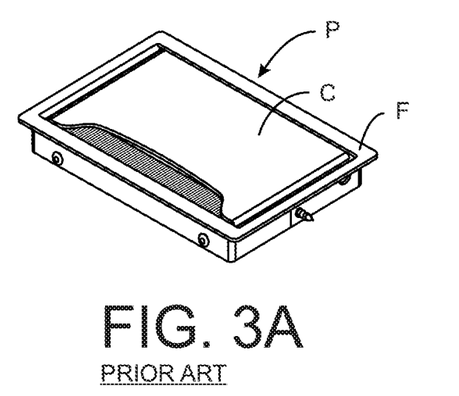
FIG. 3A is a perspective view of the prior art module of FIG. 1A shown spaced apart from the table and with the cover in the closed position.
Figure 3B:
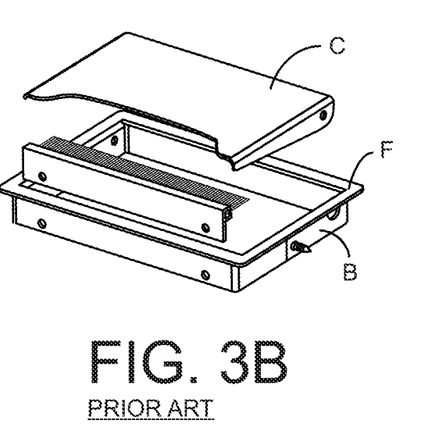
FIG. 3B is an exploded perspective view of the prior art module of FIG. 1A shown spaced apart from the table.
Figure 3C:
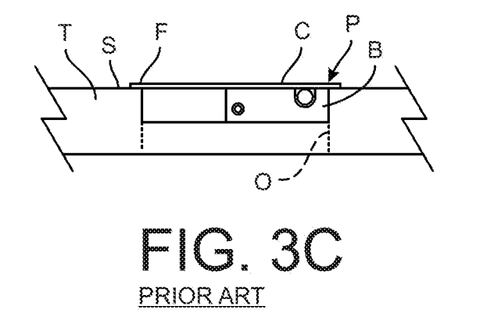
FIG. 3C is a side elevational view of the prior module of FIG. 1A shown mounted within the opening in the table.

A typical power/data access module P is shown in FIGS. 1A-3C. The module P includes a bezel B that is mounted within a correspondingly shaped opening O (FIG. 3C) in the work surface S (FIG. 3C). The bezel B includes a frame or flange F (FIGS. 3A, 3B, 3C) that sits on the surface S of the table or work station to support the module P and a cover C. The module P provides access to a receptacle R (FIGS. 1B and 2) that is either associated with the bezel B or mounted to the underside of the work surface S.

As particularly shown in FIG. 3C, the power/data access module P is mounted on the work surface S, such that a portion of the module P extends above the work surface S. Specifically, at least the flange of the bezel B extends above the work surface S. Therefore, at least the bezel B creates a discontinuity in the work surface S, particularly when no wires or cables extend through the module P and the cover C is in the closed position of FIGS. 3A and 3C. The discontinuity is disruptive to the person using the work surface S, because it provides an uneven surface for items stacked on the surface S or a feature that can catch papers and objects being pushed across the work surface S.

Figure 4A:
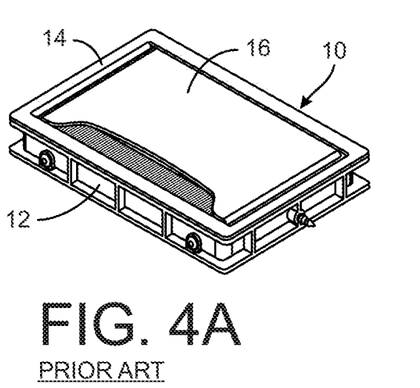
FIG. 4A is a perspective view of a prior improved power/data access module shown with a cover of the module in a closed position.
Figure 4B:
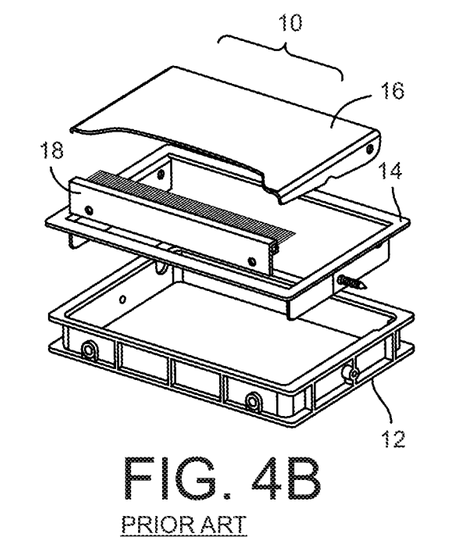
FIG. 4B is an exploded perspective view of the module of FIG. 4A showing a bezel and a grommet of the module.
Figure 4C:
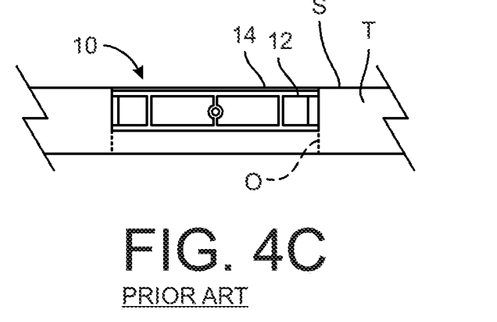
FIG. 4C is a side elevational view of the module of FIG. 4A with the module mounted in the opening of a table and with the cover in the closed position.

In order to address the deficiencies of the prior devices shown in FIGS. 1A-3C, an improved access module 10, shown in FIGS. 4A-4C, includes a grommet 12 located in the opening O and mounted to the table T, a bezel 14 mounted in and supported by the grommet 12, a cover 16 pivotably mounted to the grommet 12 and bezel 14, and a brush assembly 18 mounted to the grommet 12. The grommet 12 and the bezel 14 are located only at or below the surface S of the table T. Moreover, as also shown in FIG. 4C, when the cover 16 is in the closed position, no portion of the module 10 is located on a side of the surface S opposite the opening O. The grommet 12 includes a lightweight body that may be formed from a suitable plastic or resin material. The body includes side edges 40 and end edges 42 around the perimeter of the body that are sized for a tight fit within the opening O formed in the table T so that the edges 40, 42 are in contact with the opening O around the entire perimeter of the body and opening O. Further details of this improved access module 10 are disclosed in U.S. Pat. No. 9,800,037, issued on Oct. 24, 2017, to the present application, the entire disclosure of which is incorporated expressly herein by reference.

Even with this improved access module 10, the electrical components must be independently mounted to the underside of the table underneath the module 10 with the access ports, such as power plugs and data ports, accessible through the interior of the bezel 14. There is a need for a simplified system for associating the electrical components with the power/data access module.

SUMMARY

According to an exemplary embodiment of the disclosure, an assembly for providing electrical power and/or data access through an opening in a table, comprises an access module and an electrical module that is removably mounted to the access module below the table top. The electrical module includes a cable box including a support panel carrying one or more electrical power sockets and/or data ports, and wiring corresponding to the one or more sockets and/or ports, and a cable carrying electrical power and/or data wires terminating in one end in a connector adapted to connect to a mating socket and connected at the opposite end thereof to the wiring in the cable box for providing electrical power and/or data to a respective socket and/or data port. The access module includes a grommet mountable to the table within the opening, the grommet including a flange defining a pair of opposing channels configured to slidably receive the support panel therein so that the one or more sockets/ports are accessible through the grommet when the access module is mounted to the table.

The assembly of the present disclosure, and particularly the access module, allows the electrical module to be supported only by the access module. No additional connection of the electrical module to the table is required, which greatly simplifies the connection of electrical components in a table.

DETAILED DESCRIPTION

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles disclosed herein as would normally occur to one skilled in the art to which this disclosure pertains.

Figure 5:
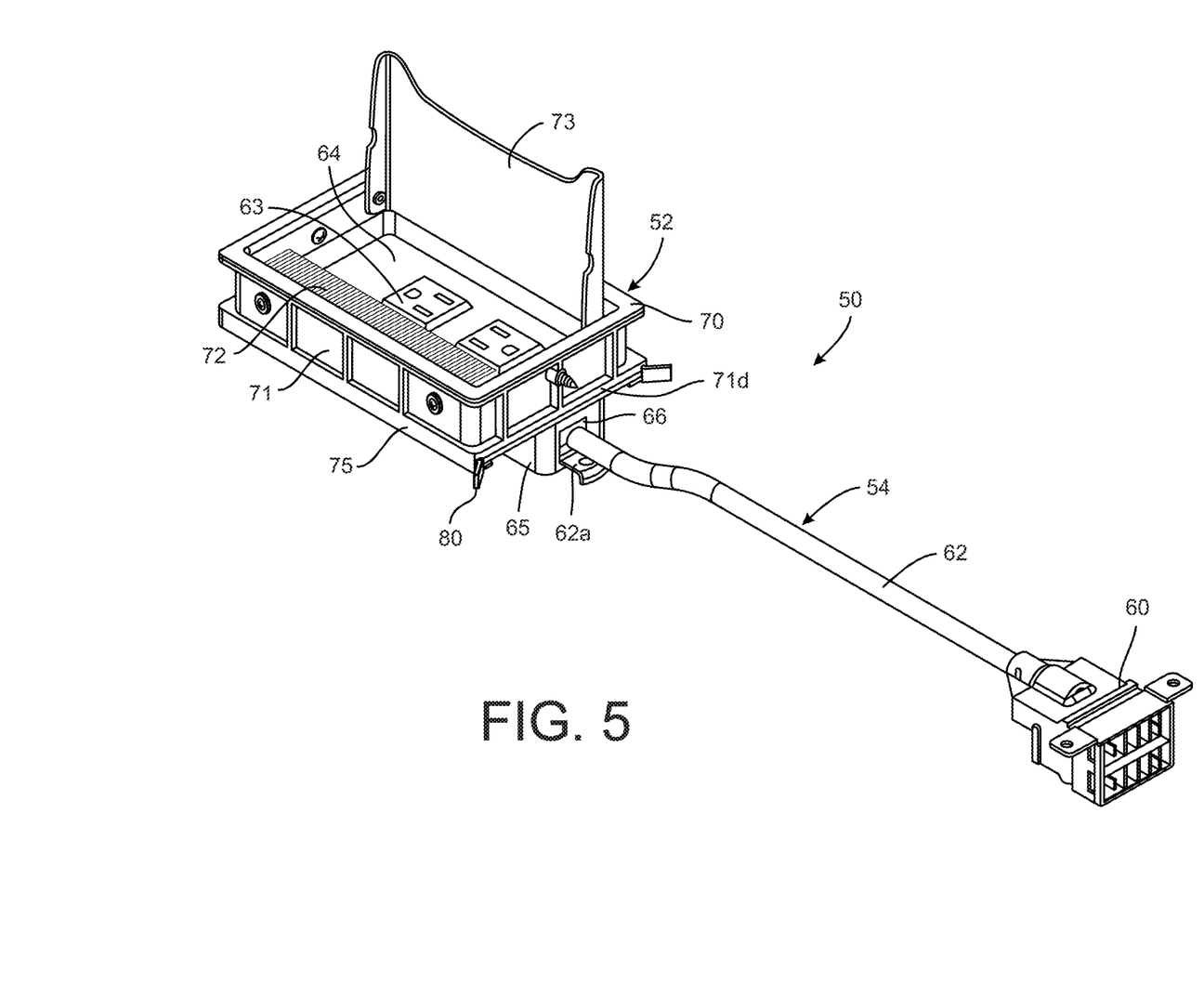
FIG. 5 is a perspective view of an electrical assembly according to the present disclosure.
Figure 6A:
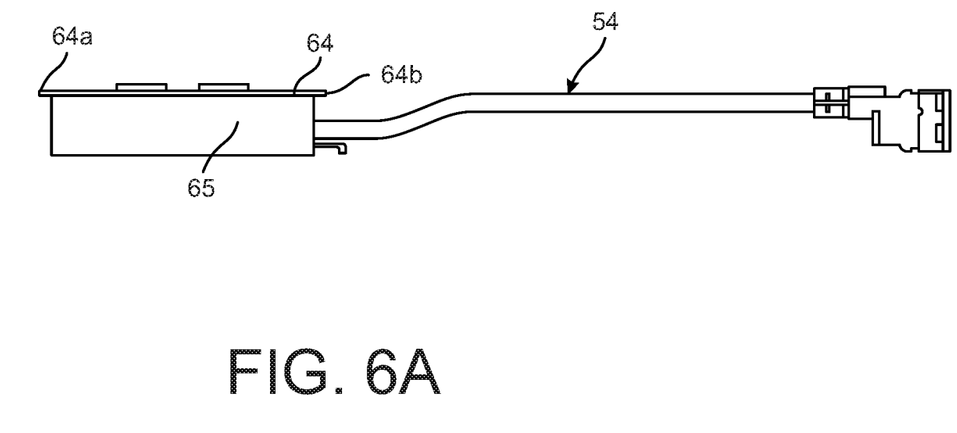
FIGS. 6A-6C are side views of the electrical assembly shown in FIG. 5.
Figure 6B:
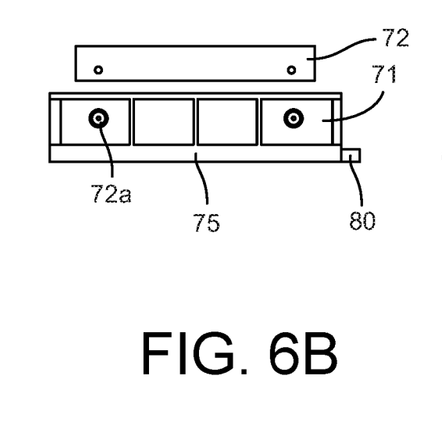
Figure 6C:
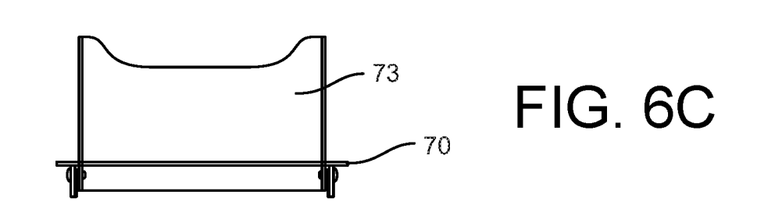

An electrical assembly 50 in accordance with the present disclosure is provided for mounting in a table T in the manner shown in FIG. 4C, although the assembly could be modified to be mounted in a table in the manner shown in FIG. 3C. The electrical assembly includes an access module 52 and an electrical module 54, as shown in FIG. 5. The electrical module 54 includes a cable carrying one or more wires for electrical power and/or data. A connector 60 is provided at the end of cable 62 that is configured to mate with a complementary socket of another electrical power/data component that may be part of or separate from the table to provide electrical communication with the cable. The opposite end of the cable 62 includes a connector 62a that is configured to be removably engaged in a cable port 66 of a cable box 65. The opposite end of the cable can also be hardwired to electrical connectors or wiring contained within the cable box 65. The cable box is carried by and supported underneath a support panel 64. The support panel 64 also supports sockets or ports 63, which can be electrical outlets or data ports or a combination thereof. The wiring to support the sockets/ports 63 is carried by the cable 62 and connected to the connector 62a in a conventional manner. The electrical module 54 can be configured with multiple wires including power and data wires that mate with corresponding sockets/ports 63.

Figure 8:
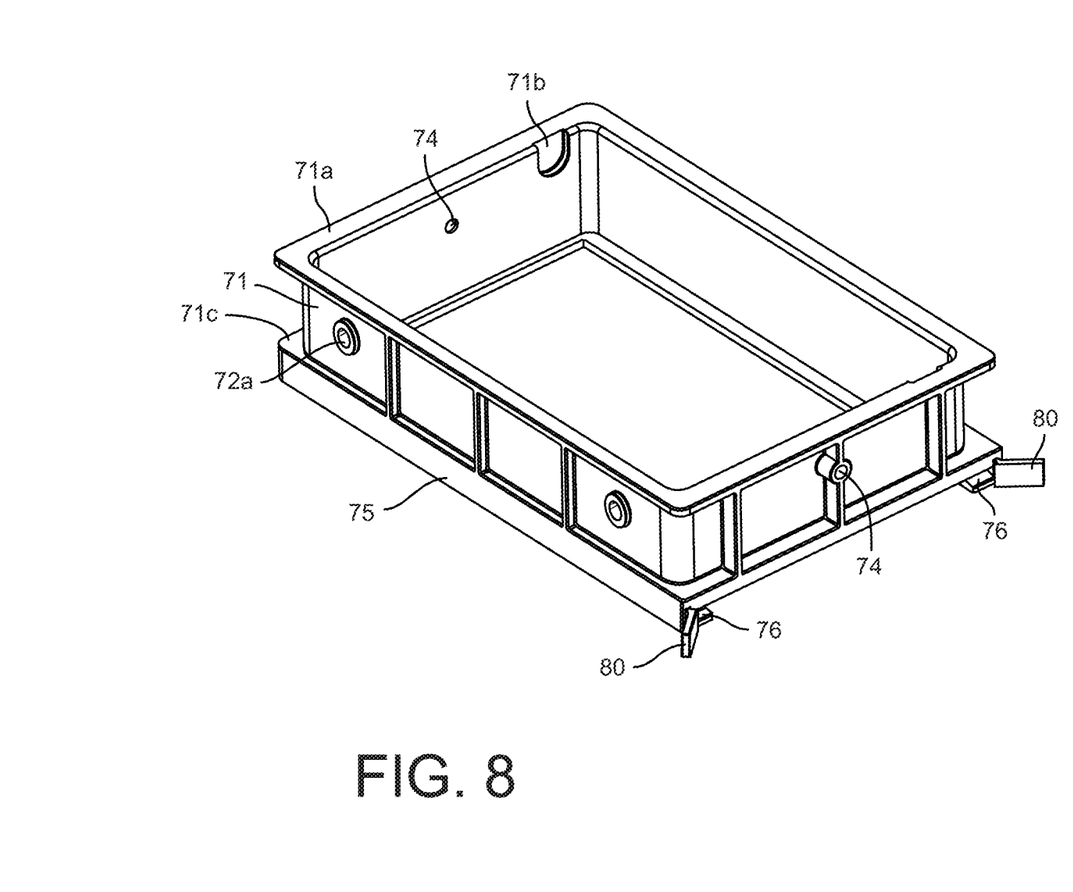
FIG. 8 is a perspective view of the bezel of the electrical assembly shown in FIG. 5.
Figure 9:
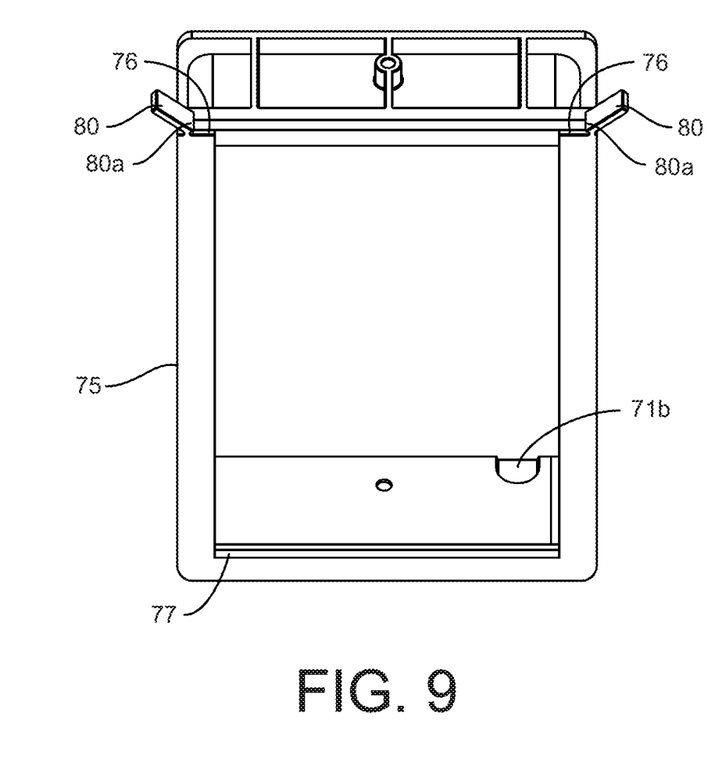
FIG. 9 is bottom perspective view of the bezel shown in FIG. 8.
Figure 10:
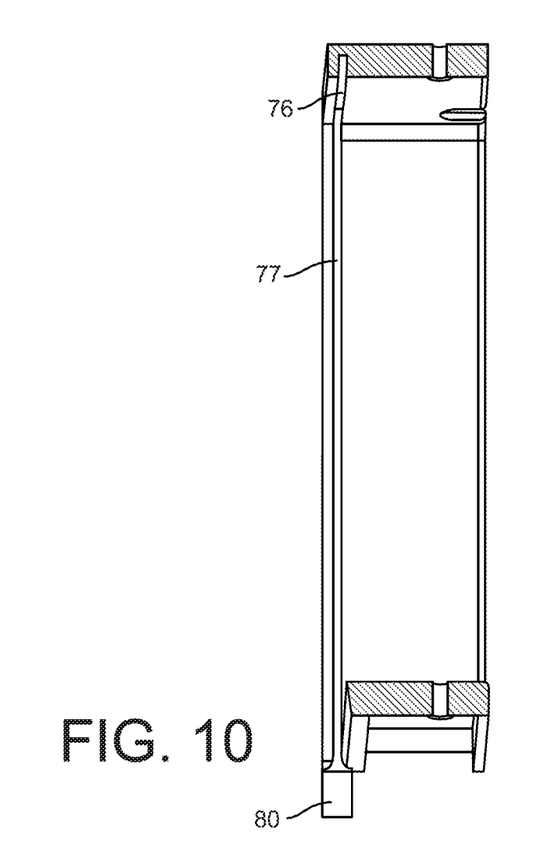
FIG. 10 is an end cross-sectional view of the bezel shown in FIG. 8.
Figure 11:
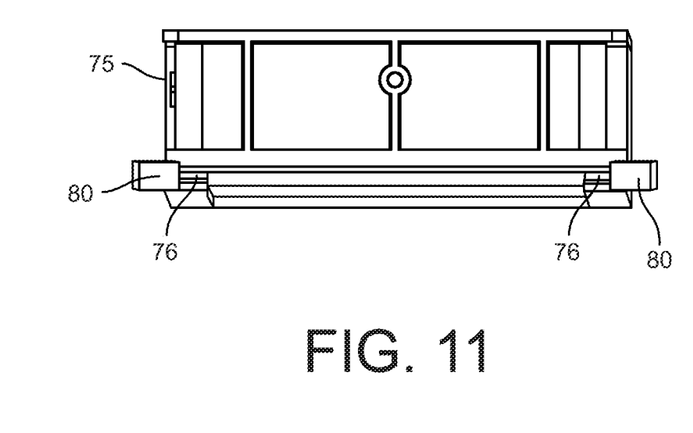
FIG. 11 is an end view of the bezel shown in FIG. 8.
Figure 12:
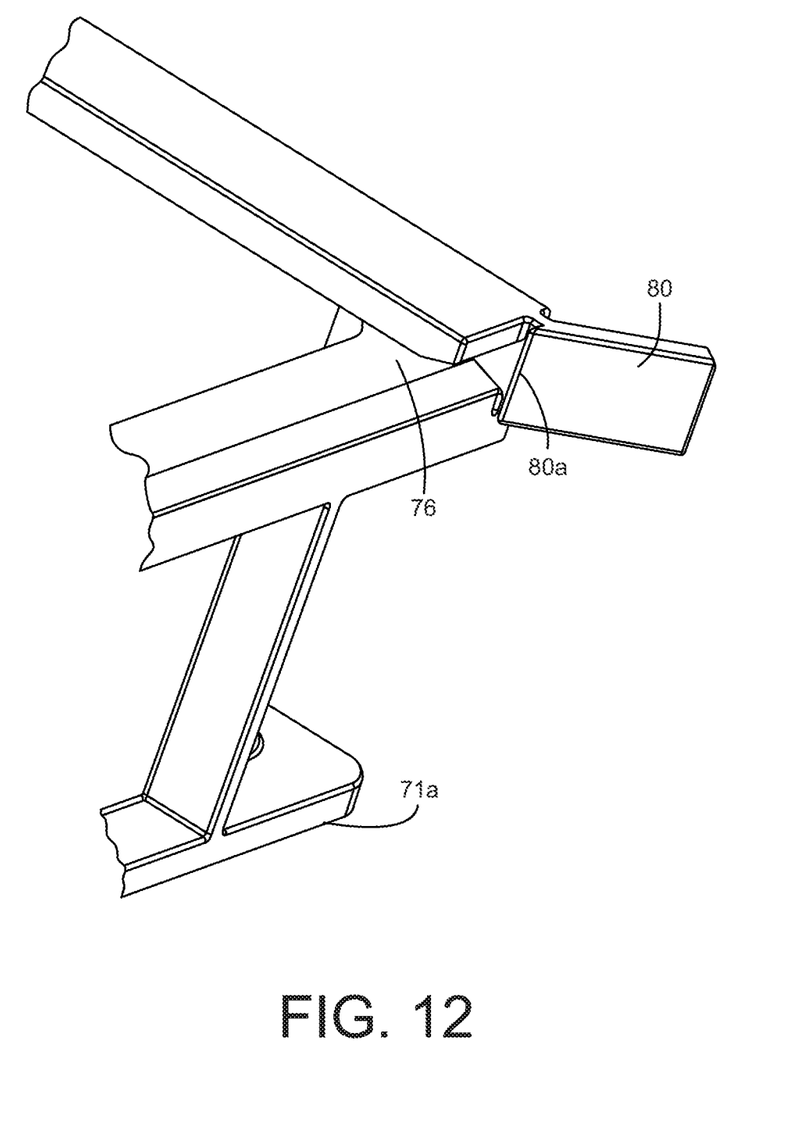
FIG. 12 is an enlarged perspective view of a channel and latch element of the bezel shown in FIG. 8.

The access module 52 is configured to mount within a table T as shown in FIG. 3C or 4C. The access module thus includes a bezel 70 and grommet 71 that can be similar to the bezel and grommet 14/12 in the prior devices described above. The grommet 71 is configured to receive mounting screws through screw holes 74, as shown in the detail view of FIG. 8. The bezel 70 is supported on the rim 71a of the grommet so that the bezel can be located at or below the surface S of the table T when the grommet is fastened to the table. The access module 52 further includes a brush assembly 72 fastened to the grommet 71 at mounting holes 72a. The brush assembly 72 includes a brush that is disposed over the one or more sockets/ports. A cover 73 is supported by cover mounts 71b on the bezel 70 arranged on the opposite side of the grommet from the brush assembly. The cover includes a cut-out 73a that allows access to the sockets/ports through the brush assembly 72 when the cover is closed.

As thus far described the bezel 70 and grommet 71 of the access module are similar to the bezel/grommet of the prior devices described above. In a novel feature of the access module disclosed herein, the grommet 71 includes a flange 75 spanning three sides of the bottom rim 71c. In particular, the flange 75 does not span the end 71d of the grommet 71 where the electrical module 54 is introduced into the access module. The flange 75 defines opposite channels 76 and a stop 77 at the end of the grommet opposite the open end 71d, as best shown in FIGS. 8-12. The channels 76 are sized to receive the support panel 64 of the electrical module such that the support panel can slide into the channels until the inboard edge 64a of the panel contacts the stop 77. In order to hold the support panel within the channels 76, the flange 75 is provided with locking tabs 80 at the open end of the channels. The locking tabs 80 include an edge 80a that bears against the outboard edge 64b of the panel 64 to hold the support panel 64, and consequently the entire electrical module 54, in contact with the access module. More particularly, this engagement allows the access module to support the electrical module without the need to mount the electrical module to the underside of the table T as in prior assemblies. The locking tabs 80 can be in the form of a resilient or pliant arm projecting from the flange 75 in which the tabs overlap the opening the respective channels in their neutral state. The plaint tabs can be depressed or bent so that the edge 80a is clear of the channel openings to permit insertion and removal of the panel from the channels. Moreover, the locking tabs 80 can be depressed to release the support panel 64 from the channels 76, thereby allowing easy and quick removal and replacement of the electrical module without the need for tools. In one embodiment, the locking tabs 80 can be in the form of a living hinge biased to the "closed" position in which the edges 80a overlap the channel openings. Alternatively, the locking tabs 80 can be in the form of a resilient clip integrated into or mounted to the flange 75. However, in the illustrated embodiment, the locking tabs 80 can be formed integrally and as one piece with the flange 75 and the rest of the grommet 71. It is thus contemplated that the grommet 71 with all of the features described above can be molded from a suitable plastic or resin material.

Figure 7:
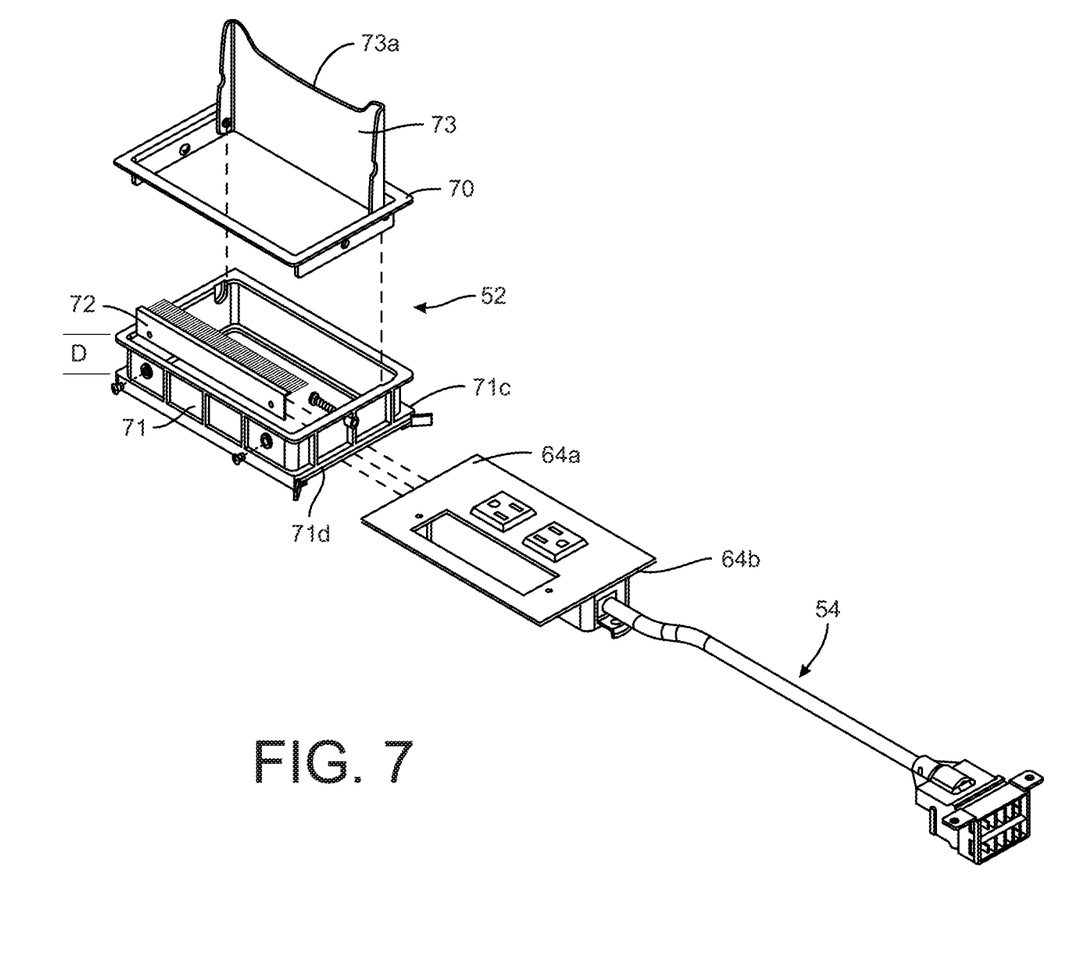
FIG. 7 is a perspective exploded view of the electrical assembly shown in FIG. 5.

It is contemplated that the access module has a depth D (FIG. 7) from the exposed surface of the bezel 70 to the bottom rim 71c that is configured so that when access module 53 is mounted within the opening in the table the channels 76 are below the bottom surface of the table T so that the support plate 64 can be introduced into the channels. Some clearance between the panel 64 and the bottom surface of the table is desirable to facilitate the introduction of the support plate.

The depth of the channels 76 can be slightly larger than the thickness of the support plate 64 to reduce movement of the support plate when a person plugs in an electrical and/or data cable into a socket/port 63. Alternatively, the channels can be deeper than the plate thickness and can include a spring clip or similar biasing element to push the plate against the upper or lower surfaces of the channels, with the purpose again being to reduce movement of the support plate. As a further alternative, the channels and/or plate can be configured to form a press-fit or friction-fit engagement at the stop 77 that again reduces movement of the support plate within the access module 52.

In the illustrated embodiment, the channels 76 are open at only one end 71d of the grommet. In an alternative embodiment, the channels 75 can be open at both ends, the end 71d and the end opposite end 71d, to allow the support panel 64 to be mounted to the access module 52 from either end. In this alternative embodiment, a second set of locking tabs 80 would be provided at the opposite end of the channels 75. The locking tabs 80 on the opposite ends of the grommet would act as a stop and as a locking element depending upon the direction of insertion of the support panel 64.

Figure 13:
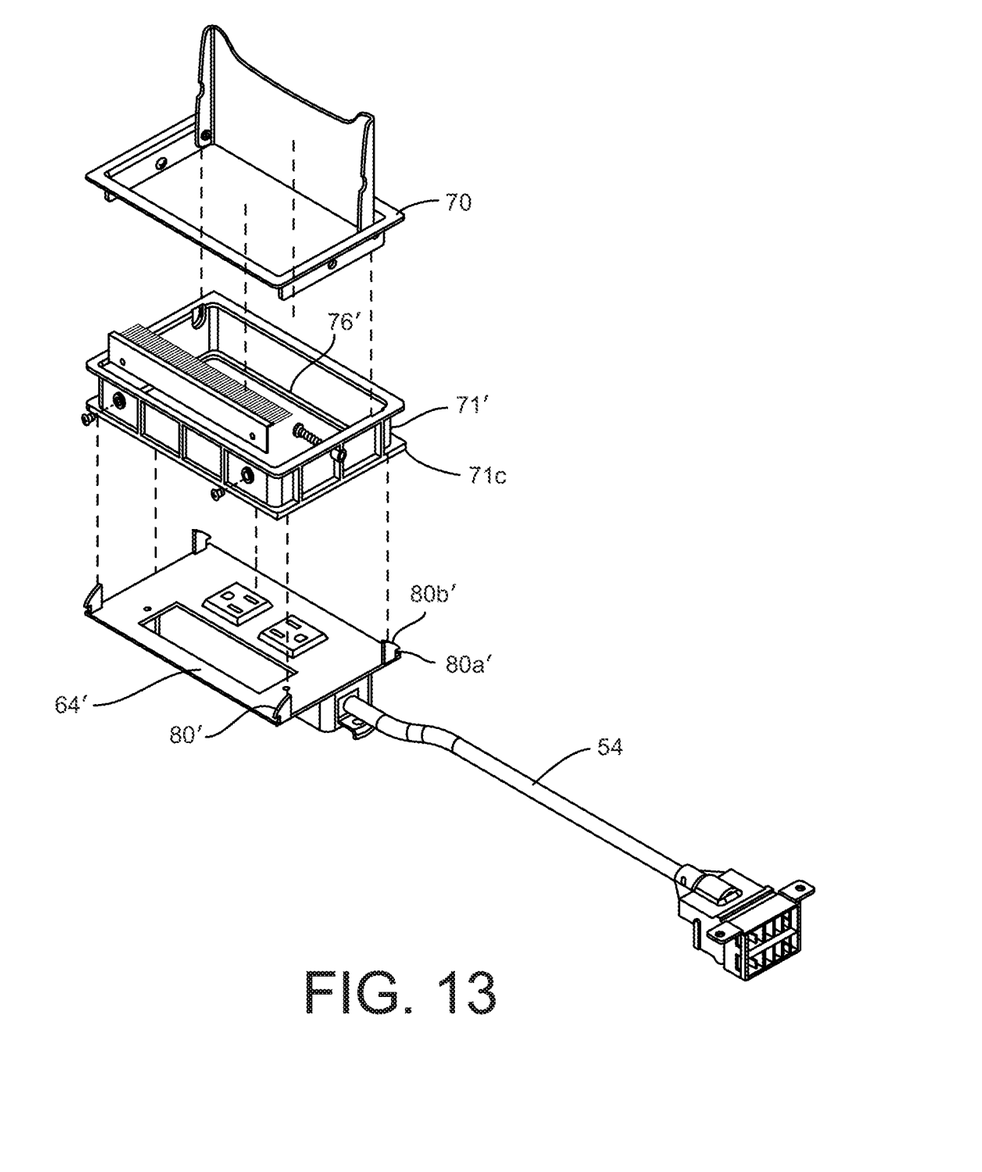
FIG. 13 is a perspective exploded view of an electrical assembly according to another embodiment of the disclosure.

The present disclosure contemplates other mechanisms for removably mounting an electrical module to an access module mounted within a table. As shown in FIG. 13, the same bezel 70 can be mounted to a grommet 71' that has been modified from the grommet 71 to eliminate the flange (75 in FIG. 8) from the bottom rim 71c'. The support panel (64 in FIG. 7) has been modified to the panel 64', whereas the remainder of the electrical module can be configured as the module 54 described above. However, the support panel 64' includes upward projecting latch elements 80' that define a hook edge 80a'. The hook edge 80a' is configured to engage an inner ledge 76' defined in the interior of the grommet 71'. The latch elements 80' are configured so that the support panel 64' is in contact with the underside of the ledge 76' when the hook edge 80a' engages the top side of the ledge. The support panel 64', and thus the electrical module, is firmly supported on the grommet 71' of the access module. The support panel can be easily engaged to the grommet by simply pushing the panel upward toward the grommet. The latch elements 80' are resilient to deflect slightly as the curved upper edge 80b' of the latch element is pressed against the ledge 76'. The support panel is pushed further upward until the hook edge 80a' engages the top face of the ledge. The support panel can be removed by reaching through the grommet opening and pushing the latches 80' on one side inward until the hook edges 80a' are clear of the ledge 76'.

The grommet includes at least two ledges 76' on opposite sides of the grommet. The support panel includes a pair of latch elements on each opposite side of the support panel in alignment with the opposite sides of the grommet. The pair of latch elements are preferably located at the ends of each of the opposite sides of the panel to provide a stable engagement with the grommet.

The present disclosure should be considered as illustrative and not restrictive in character. It is understood that only certain embodiments have been presented and that all changes, modifications and further applications that come within the spirit of the disclosure are desired to be protected.

What is claimed is:

1. An assembly for providing electrical power and/or data access through an opening in a table, comprising:
    an electrical module including;
        a cable box including a support panel carrying one or more electrical power sockets and/or data ports, and wiring corresponding to the one or more sockets and/or ports; and
        a cable carrying electrical power and/or data wires terminating in one end in a connector adapted to connect to a mating socket and connected at the opposite end thereof to said wiring in said cable box for providing electrical power and/or data to a respective socket and/or data port; and
    an access module including;
        a grommet mountable to the table within the opening, the grommet including a flange defining a pair of opposing channels configured to slidably receive the support panel therein so that the one or more sockets/ports are accessible through the grommet when the access module is mounted to the table.

2. The assembly of claim 1, wherein said access module further includes a locking tab at one end of each of said channels, said locking tab configured to prevent removal of said support panel from within said channels.

3. The assembly of claim 2, wherein said locking tab for each of said channels is:
    movable to a locking position in which the locking tab prevents removal of said support plate form said channels; and
    movable to a release position in which the locking tab does not prevent removal of said support plate form said channels.

4. The assembly of claim 3, wherein said locking tab for each of said channels is biased to said locking position.

5. The assembly of claim 2, wherein said grommet is in one-piece integrally formed with said flange, said channels and said locking tab for each of said channels.

6. The assembly of claim 2, wherein said opposing channels each include a stop at an end opposite said one end, said stop configured to abut said support panel when the support panel is disposed within said channels.

7. The assembly of claim 1, wherein said access module further includes a bezel mounted on said grommet to be disposed at or below the top surface of the table when the grommet is mounted to the table.

8. The assembly of claim 7, wherein said access module further includes a cover pivotably mounted to the bezel and configured to substantially cover said one or more socket/port.

9. The assembly of claim 1, wherein said access module further includes a brush assembly mounted to the grommet.

10. The assembly of claim 1, wherein said cable box includes a cable port electrically connected to said one or more sockets/ports, and said cable includes a mating connector at said opposite end configured for removable connection to said cable port.

11. An assembly for providing electrical power and/or data access through an opening in a table, comprising:
    an electrical module including;
        a cable box including a support panel carrying one or more electrical power sockets and/or data ports, and wiring corresponding to the one or more sockets and/or ports; and
        a cable carrying electrical power and/or data wires terminating in one end in a connector adapted to connect to a mating socket and connected at the opposite end thereof to said wiring in said cable box for providing electrical power and/or data to a respective socket and/or data port;
    an access module including a grommet mountable to the table within the opening; and
    a latch structure between said grommet and said support panel to removably engage said support panel to said grommet so that the one or more sockets/ports are accessible through the grommet when the access module is mounted to the table.

12. The assembly of claim 11, wherein said latch structure includes:
    a flange extending from said grommet and defining a pair of opposing channels configured to slidably receive the support panel; and
    a locking tab at one end of each of said channels, said locking tab configured to prevent removal of said support plate from within said channels.

13. The assembly of claim 11, wherein said latch structure includes:
    at least two inwardly facing ledges defined on opposite sides of said grommet; and
    at least a pair of latch elements projecting from each of the opposite sides of said support panel, each of said latch elements including a hook edge configured to engage a corresponding one of said ledges to engage the support panel to said grommet.

\* \* \* \* \*